US012695622B2

(12) United States Patent
Bohn et al.

(10) Patent No.: US 12,695,622 B2
(45) Date of Patent: Jul. 28, 2026

(54) GENERATING NON-REDUNDANT PHYSICAL, LOGICAL, AND LOCATION-SPECIFIC NETWORK ENDPOINT IDENTIFIERS

(71) Applicant: NXP B.V., Eindhoven (NL)

(72) Inventors: Sebastian Bohn, Dresden (DE); Kai Wu, San Diego, CA (US); Milan Brejl, Roznov pod Radhostem (CZ); Timothy Strauss, Granger, IN (US); Fahad Qazi, Steningehöjden (SE)

(73) Assignee: NXP B.V., Eindhoven (NL)

( * ) Notice: Subject to any disclaimer, the term of this patent is extended or adjusted under 35 U.S.C. 154(b) by 1 day.

(21) Appl. No.: 18/822,866

(22) Filed: Sep. 3, 2024

(65) Prior Publication Data

US 2026/0067097 A1      Mar. 5, 2026

(51) Int. Cl.
| | |
|---|---|
| *H04L 9/32* | (2006.01) |
| *G06K 7/10* | (2006.01) |
| *G06K 19/07* | (2006.01) |

(52) U.S. Cl.
CPC ........ *H04L 9/3247* (2013.01); *G06K 7/10128* (2013.01); *G06K 7/10297* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 7,246,744 | B2 | 7/2007 | O'Brien et al. |
| 7,420,467 | B2 | 9/2008 | Patenaude et al. |
| 10,578,730 | B2 | 3/2020 | Cardno et al. |
| 10,909,335 | B2 | 2/2021 | Lee et al. |
| 11,348,067 | B2 | 5/2022 | Schoening |
| 2004/0268132 | A1 | 12/2004 | Waris |
| 2006/0061482 | A1 | 3/2006 | Monney et al. |
| 2016/0132704 | A1 | 5/2016 | Engels et al. |
| 2018/0299540 | A1* | 10/2018 | Cardno ................... G01S 13/75 |

OTHER PUBLICATIONS

Yang Kun et al: "An RFID-based technology for electronic component and system Counterfeit detection and Traceability" 2015 IEEE International Symposium On Technologies for Homeland Security (HST), IEEE, Apr. 14, 2015, pp. 1-6.

* cited by examiner

*Primary Examiner* — Kristy A Haupt

(57)      ABSTRACT

First information identifying a first one of a target circuit or a radio frequency (RF) tag is conveyed to a second one of the target circuit or the RF tag. Second information identifying the second one of the target circuit and the RF tag is then derived from the conveyed first information. The second information is then stored. In some cases, the first information is conveyed over a wired interface or a wireless interface between the target circuit and the RF tag. The first information identifying the RF tag can be conveyed to the target circuit, and second information identifying the target circuit can be derived based on the first information identifying the RF tag by equating the second information to the first information or applying a predetermined algorithm to the first information to generate the second information.

16 Claims, 7 Drawing Sheets

GENERATING NON-REDUNDANT PHYSICAL, LOGICAL, AND LOCATION-SPECIFIC NETWORK ENDPOINT IDENTIFIERS

BACKGROUND

Many systems and products are heterogeneous conglomerations of different types of devices or sensors that perform different functions in the system or product. The devices and sensors are often referred to as endpoints. A familiar example of a heterogeneous system is an automobile. The endpoints in an automobile typically include headlights, taillights, safety/radar sensors, LED lighting strips, climate control vents, along with many other types of devices or sensors.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
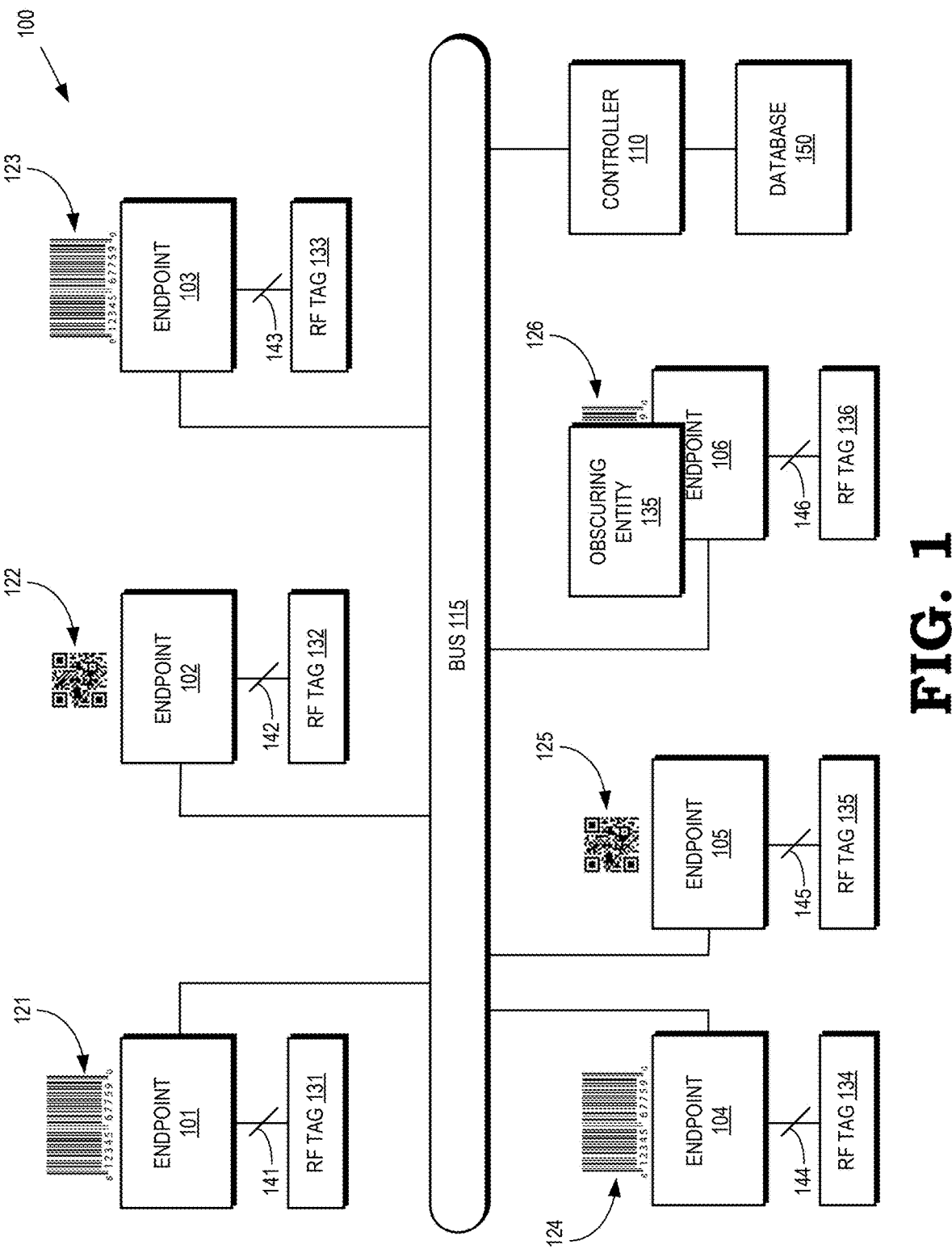
FIG. 1 illustrates a system that includes devices or sensors that receive instructions from a controller to perform functions or provide sensed data to the controller, according to some embodiments.

Devices, sensors, and other components of a heterogeneous system are referred to herein as "endpoints" or "target circuits." A controller coordinates the operation of interconnected endpoints by transmitting control signals to the endpoints and, in some cases, receiving feedback from the endpoints. Multiple endpoints (or target circuits) can be implemented using substantially identical circuitry and components, and yet perform different functions depending upon their location within the automobile. For example, taillights installed on the driver's side and passenger's side of the car may be identical but perform different functions depending on where they are installed. An illuminated taillight on the driver's side signals that the driver is making a left-hand turn, and the same endpoint on the passenger's side signals that the driver is making a right-hand turn. For another example, a climate control vent installed near the front driver's side seat may be controlled based on feedback from a temperature sensor located near the front driver's side seat, whereas a climate control vent installed near the rear passenger's side seat may be controlled based on feedback from a temperature sensor located near the rear passenger's side seat. Location-dependent functionality of otherwise identical endpoints is a characteristic of many systems including smart homes, smart energy grids, smart cities, in-vehicle networks, and fully automated or "dark" factories.

Control circuitry for a heterogeneous system is typically connected to endpoints in the system by a shared medium such as a bus. The endpoints are conventionally preprogrammed with a unique identifier (or UID) that is used to facilitate communication between the endpoint and the network over the bus. The UID for each of the endpoints is assigned and registered separately, and the registration process is time and labor intensive. For example, in some cases, the UIDs of the endpoints are displayed on the exterior of the endpoint, e.g., using a barcode imprinted on the endpoint. To register the endpoint and its UID, the UID is read from the imprinted barcode, associated with the endpoint, and then this information is stored in a central database. Radio frequency identifiers (RFIDs or RF tags) can also be attached to endpoints, e.g., by gluing the RF tag to the endpoint. Each RF tag has its own UID. Consequently, two different, redundant UIDs are associated with the same endpoint (and location) when an RF tag is attached to the endpoint.

Locations of the endpoints are registered with the control circuitry when the endpoints are installed during system assembly. The UID associated with an endpoint can be difficult or impossible to read after the endpoint has been installed. Registration of a location of an endpoint and its corresponding UID is therefore performed before the endpoint is installed or mounted. For example, a technician installing taillights on a car may register information in a database indicating that the taillight is installed on the driver's side and then the technician (or other person or device or robot) may install the taillight on the driver's side. Registering the endpoint before installation can lead to errors because the endpoint may be registered in one location and then installed in a different location or not installed at all. For example, the technician may register information in the database indicating that the taillight is installed on the driver's side, but the technician (or other person or device or robot) may install the taillight on the passenger's side. Errors in the endpoint location, location database, or presence of the endpoint are difficult to detect and/or correct after installation. For example, the mapping of an endpoint identifier to a location within a system, such as a car, cannot be confirmed after the endpoint has been installed if the line of sight to a barcode on the endpoint is obscured. Generally, the inability to see or access the UIDs of the endpoints in a system complicates maintenance, upgrading, diagnosis, repair, and replacement of endpoints in the system.

FIGS. 1-7 depict systems and methods of generating non-redundant network endpoint identifiers. An endpoint and a radio frequency (RF) tag are coupled to allow one of the devices to derive its identifier (such as a UID) from an identifier of the other device. In some embodiments, the endpoint acquires an RF tag identifier from an associated RF tag over an interface between the endpoint and the RF tag. The interface can be a wired interface such as an inter-integrated circuit (I²C) connection or a wireless interface between the RF tag and a radio in the endpoint. The RF tag can be implemented as an RFID, a near field communication (NFC) device, an ultra-wideband (UWB) device, or any other short-range or long-range wireless device. In some cases, the RF tag encrypts, signs, or authenticates the RF tag identifier before information representing the RF tag identifier is conveyed over the interface. The endpoint derives its endpoint identifier from the information representing the RF tag identifier. Deriving the endpoint identifier can include equating the endpoint identifier to the RF tag identifier or applying a predetermined algorithm to the RF tag identifier. In some cases, the endpoint also decrypts the RF tag identifier, validates a signature associated with the RF tag identifier, and/or authenticates the RF tag identifier before generating the endpoint identifier. The endpoint identifier can be transmitted to a controller and/or stored in a memory of the endpoint.

The location of the endpoint can be determined without a clear line of sight to the endpoint. For example, an RF reader can register endpoints by scanning the environment to locate RF tags. In response to detecting an RF tag, the RF reader reads the RF tag identifier and determines the location of the RF tag. In some cases, the location of the RF tag is determined based on the location of the RF reader and the signal strength of a signal received from the RF tag by the RF reader. Once the RF reader has located the RF tag associated with an endpoint and determined its location, the RF reader can transmit the RF tag identifier (or information representing the RF tag identifier) and location to the controller. The controller or other entity derives the endpoint identifier from the RF tag identifier (or the information representing the RF tag identifier) and registers the endpoint identifier and the location of the endpoint. In some cases, the RF reader provides the location information to the RF tag, which can convey the location information to the endpoint for registration with the controller. In some cases, a tuple including the endpoint identifier and the endpoint location are stored by the endpoint, the RF reader, or a combination thereof.

The endpoint identifiers derived from the RF tag identifiers can be used to locate endpoints after they have been installed regardless of whether there is a clear line of sight to the installed endpoint. For example, the RF reader can be used to locate or confirm the location of an endpoint by scanning for the RF tag of the endpoint at a location. In response to detecting the RF tag, the RF reader conveys information representing the detected RF tag identifier to the controller. The conveyed information can represent the RF tag identifier, the endpoint identifier derived from the RF tag identifier, or encrypted or signed versions of either identifier. The controller can identify the endpoint at the location based on the RF tag identifier (or information representative of the RF tag identifier) because, as discussed above, the endpoint identifier is either equivalent to the RF tag identifier or derived from the RF tag identifier by a predetermined algorithm. The controller can then compare the location and derived endpoint identifier with information in the database to confirm that the endpoint is in its expected location.

FIG. 1 illustrates a system 100 that includes devices or sensors that receive instructions from a controller to perform functions or provide sensed data to the controller, according to some embodiments. The devices, sensors, and other components of the system 100 are implemented using circuitry and are represented as target circuits or target circuits 101, 102, 103, 104, 105, 106, which are collectively referred to herein as "the endpoints 101-106" or "the target circuits 101-106." Some embodiments of the system 100 are used to implement a vehicle. In that case, the endpoints 101-106 represent devices including, but not limited to, headlights, taillights, safety/radar sensors, LED lighting strips, climate control vents, as well as other types of devices or sensors.

The endpoints 101-106 communicate with a controller 110 via a shared medium such as a bus 115, e.g., by exchanging digital signals over the bus 115. The endpoints 101-106 can transmit signals indicating information generated at the endpoints 101-106 to the controller 110 via the bus 115. For example, the endpoints 102, 105 can represent temperature sensors in a vehicle and the endpoints 102, 105 can transmit information representing sensed temperatures to the controller 110. The endpoints 101-106 can also receive signals representing instructions from the controller 110; the instructions control operation of the receiving endpoints 101-106. For example, the controller 110 can generate and provide signals that illuminate taillights associated with the endpoints 101, 104 in a vehicle represented by the system 100. For another example, the controller 110 can generate and provide signals that control climate control vents associated with the endpoints 103, 106 in response to the temperature information provided by the endpoints 102, 105.

Operation of the endpoints 101-106 differs depending on their location within the system 100. For example, in embodiments of the system 100 that represent a vehicle, the endpoints 101, 104 may represent taillights installed on the left-hand side and right-hand side of the car, respectively. The endpoints 101, 104 are implemented with substantially identical circuitry and components but perform different functions depending on where they are installed in the system 100. Illuminating the taillight associated with the endpoint 101 signals that the driver is making a left-hand turn, and illuminating the taillight associated with the endpoint 104 signals that the driver is making a right-hand turn. For another example, a climate control vent (associated with the endpoint 103) installed near the front left-hand side seat may be controlled based on feedback from a temperature sensor (associated with the endpoint 102) located near the front right hand side seat, whereas a climate control vent (associated with the endpoint 106) installed near the rear left-hand side seat may be controlled based on feedback from a temperature sensor (associated with the endpoint 105) located near the rear right-hand side seat. Although some of the embodiments disclosed herein are discussed in the context of a vehicle, the system 100 can represent other systems that are characterized by the location-dependent functionality of endpoints 101-106 that are implemented using substantially identical circuitry and components. Examples include, but are not limited to, smart homes, smart energy grids, smart cities, in-vehicle networks, and fully automated or "dark" factories.

In the illustrated embodiment, the endpoints 101-106 are associated with identifiers 121, 122, 123, 124, 125, 126 (collectively referred to herein as "the identifiers 121-126") that are imprinted or attached to the exterior of the corresponding endpoints 101-106. The identifiers 121-126 can be implemented as barcodes, such as the identifiers 121, 123, 124, 126. The identifiers 121-126 can also be implemented as QR codes, such as the identifiers 122, 125. The identifiers 121-126 can also be implemented as character strings, numerical strings, other symbols, or combinations thereof. Radio frequency identifiers (RFIDs or RF tags) 131, 132, 133, 134, 135, 136 are also attached to the endpoints 101-106, e.g., by gluing the RF tag to the endpoint. The radio frequency identifiers 131, 132, 133, 134, 135, 136 are collectively referred to herein as "the RF tags 131-136." The RF tags 131-136 are associated with corresponding identifiers such as character strings, numerical strings, other symbols, or combinations thereof. For example, the RF tags 131-136 can store information representing the corresponding identifiers.

The system 100 includes one or more obscuring entities 135 that obscure at least a portion of one or more of the identifiers 121-126 when the obscuring entity 135 and the endpoints 101-106 are installed in the system 100. The obscuring entity 135 can include other devices, sensors, or structural elements of the system 100. The obscuring entity 135 can also include one or more of the endpoints 101-106, although the endpoints 101-106 are not depicted in FIG. 1 as obscuring the identifiers 121-126 associated with other endpoints 101-106. The obscuring entity 135 makes it difficult or impossible to read the obscured identifier, e.g., the identifier 126 of the endpoint 106. Thus, it may be difficult or impossible to determine the identity of the endpoints 101-106 after installation, which makes it difficult or impossible to register or verify or confirm a location of one or more of the endpoints 101-106 after installation.

Identifiers of the endpoints 101-106 are generated based on identifiers associated with the RF tags 131-136. The RF tags 131-136 and the endpoints 101-106 are connected by corresponding interfaces 141, 142, 143, 144, 145, 146, which are collectively referred to herein as "the interfaces 141-146." Some embodiments of the interfaces 141-146 are implemented as a wired interface such as an inter-integrated circuit ($I^2C$) connection or a wireless interface between the RF tags 131-136 and radios in the endpoints 101-106. In some embodiments, the identifiers are considered "non-redundant" identifiers because the same identifier is used to indicate both the endpoints 101-106 and the corresponding RF tags 131-136. The non-redundant identifiers are generated by conveying information identifying either the endpoint 101-106 or the corresponding RF tag 131-136 to the other one of the endpoint and the RF tag. For example, the endpoint 101 can convey identifying information over the interface 141 to the RF tag 131, or the RF tag 131 can convey identifying information over the interface 141 to the endpoint 101.

The non-redundant information identifying the other one of the endpoint or the RF tag (such as a unique identifier, UID) is derived from the information conveyed over the interface. For example, the endpoint 101 can derive a UID from identifying information conveyed over the interface 141 by the RF tag 131. The information identifying the endpoint or RF tag is then stored. In some embodiments, the non-redundant identifying information is derived by equating the non-redundant information to the information received over the interfaces 141-146. The non-redundant identifying information can also be derived or generated by applying a predetermined algorithm to the information received over the interfaces 141-146. In some embodiments, the information transmitted over the interfaces 141-146 is encrypted, signed, or associated with other authentication information prior to being transmitted over the interfaces 141-146. The receiving entity can therefore decrypt, verify a signature, or authenticate the information received over the interfaces 141-146 prior to deriving the non-redundant identifying information.

Locations of the endpoints 101-106 can be detected or determined based on the non-redundant identifying information. In some embodiments, the locations and non-redundant identifying information for the endpoints 101-106 are registered in a database 150. In the illustrated embodiment, the database 150 is connected to the controller 110. However, in some embodiments, the database 150 is integrated within the controller 110 or connected to the controller 110 via the bus 115. Locations of the endpoints 101-106 can be determined by detecting the corresponding RF tags 131-136 using a device such as a scanner. For example, in response to detecting one of the RF tags 131-136 proximate the scanner, the location of the corresponding one of the endpoints 101-106 is determined based on the location of the scanner and a strength of a signal received by the scanner. Proper installation of the endpoints 101-106 can be confirmed or verified after installation. In some embodiments, the scanner is used to scan an area proximate an expected installation location of one of the endpoints 101-106, which is located (or the location is confirmed) in response to detecting the corresponding one of the RF tags 131-136 proximate the expected installation location.

Figure 2:
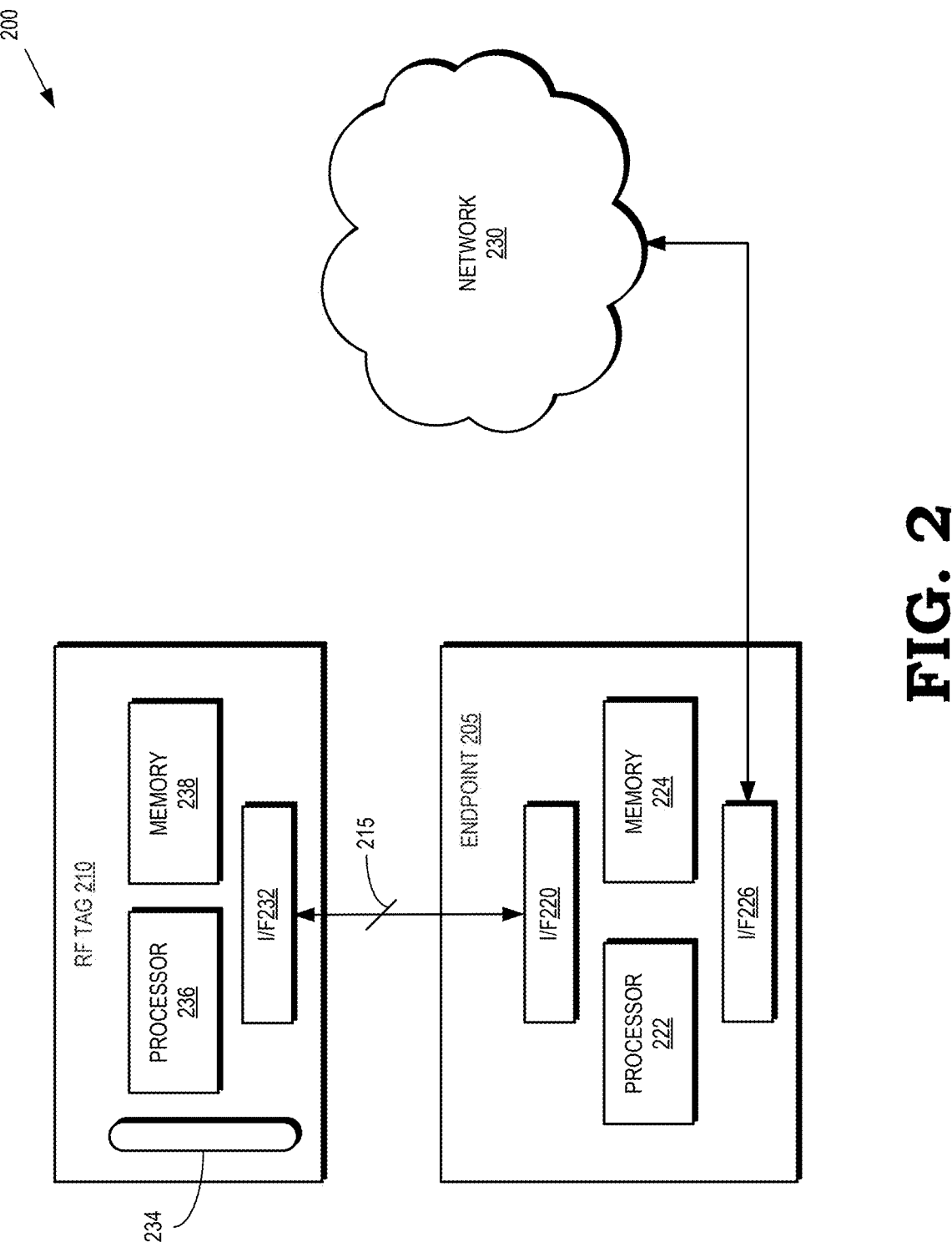
FIG. 2 illustrates a system that includes an endpoint and a radio frequency (RF) tag, according to some embodiments.

FIG. 2 illustrates a system 200 that includes an endpoint 205 and an RF tag 210, according to some embodiments. The system 200 can represent a portion of the system 100 shown in FIG. 1, in which case the endpoint 205 represents one or more of the endpoints 101-106 and the RF tag 210 represents one or more of the RF tags 131-136 shown in FIG. 1. A connection 215 supports communication between the endpoint 205 and the RF tag 210. The connection 215 can be implemented as a wired connection, e.g., I2C, or a wireless, or over-the-air, connection. In some embodiments, the endpoint 205 and the RF tag 210 are implemented in a single integrated circuit or device.

The endpoint 205 includes an interface 220 to the connection 215. The endpoint 205 also includes circuitry for implementing a processor 222 and, in some embodiments, a memory 224 that is configured to store instructions to be executed by the processor 222, information or data that is provided as input to the processor 222, and information or data representing the results of operations performed by the processor 222. The endpoint 205 also includes an interface 226 that allows the endpoint 205 to communicate with a network 230. The interface 226 can be a wired interface that supports communication over a wired connection with the network 230 or a wireless interface that supports wireless communication with the network 230.

The RF tag 210 includes an interface 232 that supports wired or wireless communication with the endpoint 205 via the connection 215. The RF tag 210 supports a wireless transmission capability via an antenna 234, which can be used as part of the interface 232 if the connection 215 is established wirelessly. In some cases, the RF tag 210 can selectively enable or disable wireless transmission. Some embodiments of the RF tag 210 include circuitry for implementing a processor 236 and a memory 238 that is configured to store instructions to be executed by the processor 236, information or data that is provided as input to the processor 236, and information or data representing the results of operations performed by the processor 236. For example, the processor 236 can include circuitry to implement a secure element that performs encryption, generates authentication information, generates signatures, or a combination thereof.

A non-redundant identifier of the endpoint 205 or the RF tag 210 is created (or derived or generated) based on information in the other one of the endpoint 205 or the RF tag 210. Information identifying one of the endpoint 205 or the RF tag 210 is conveyed over the connection 215 to the other one of the endpoint 205 and the RF tag 210. In response, information identifying the other one of the endpoint 205 and the RF tag 210 is derived from the information received over the connection 215. In some embodiments, the endpoint 205 reads identifying information (such as a UID) for the RF tag 210 from the memory 238 in the RF tag 210.

The endpoint 205 then derives its UID from the UID of the RF tag 210. The UID of the endpoint 205 can be set equal to the UID of the RF tag 210 or the UID of the endpoint 205 can be set equal to a value derived from the UID of the RF tag using a predetermined algorithm. The endpoint 205 then transmits its (non-redundant) UID to the network 230. In some embodiments, the endpoint 205 stores a shadow copy of its UID in its memory 224.

Figure 3:
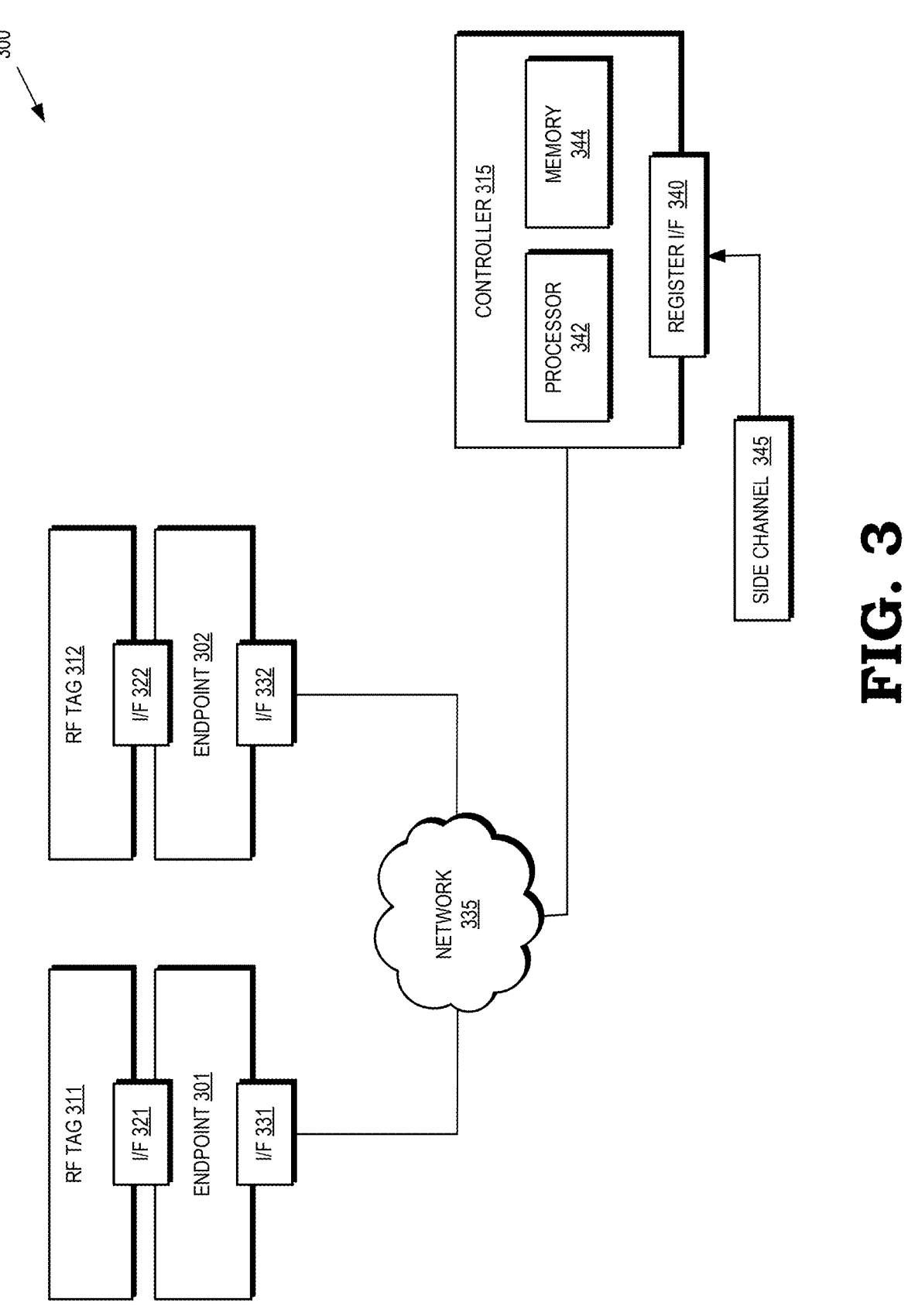
FIG. 3 illustrates a system that includes endpoints and RF tags that are registered with a controller, according to some embodiments.

FIG. 3 illustrates a system 300 that includes endpoints 301, 302 and RF tags 311, 312 that are registered with a controller 315, according to some embodiments. The system 300 can represent a portion of the system 100 shown in FIG. 1, in which case the endpoints 301, 302 represent two or more of the endpoints 101-106, the RF tags 311, 312 represent two or more of the RF tags 131-136, and the controller 315 represents the controller 110 shown in FIG. 1. Some embodiments of the endpoints 301, 302 are implemented using substantially identical circuitry and components, and therefore are substantially identical target circuits. The endpoints 301, 302 and the RF tag 311, 312 are connected to each other by interfaces 321, 322, and the endpoints 301, 302 are connected to the controller 315 via interfaces 331, 332 and a network 335.

The controller 315 includes a register interface 340 that allows the controller 315 to receive registration information associated with the endpoints 301, 302 such as information indicating the locations of the endpoints 301, 302. In the illustrated embodiment, the register interface 340 receives information associated with the endpoints 301, 302, such as location information, via a side channel 345. The register interface 340 can therefore receive the information from a technician, a third party, or other source. The controller 315 also includes circuitry for implementing a processor 342 and, in some embodiments, a memory 344 that is configured to store instructions to be executed by the processor 342, information or data that is provided as input to the processor 342, and information or data representing the results of operations performed by the processor 342. The controller 315 is also configured to communicate with the network 335 so that the controller 315 can receive registration information from the endpoints 301, 302.

To register the endpoints 301, 302 with the controller 315, the endpoints 301, 302 read identifiers from the corresponding RF tags 311, 312. The identifiers can be in the form of an Internet protocol (IP) address, a medium access control (MAC) address, a control area network (CAN) address, and the like. In some cases, the endpoints 301, 302 read the identifiers from the RF tags 311, 312 in response to the endpoints 301, 302 connecting to the controller 315 via the network 335. The endpoints 301, 302 can decrypt or authenticate the identifier if the identifier has been encrypted or authentication information has been included with the information received from the corresponding RF tag 311, 312. The endpoints 301, 302 derive their identifiers from the received information and, in some cases, store shadow copies of their identifiers. The endpoints 301, 302 then transmit information representing their identifiers to the controller 315.

The controller 315 associates the identifiers of the endpoints 301, 302 with additional information such as an endpoint type, a physical location of the endpoint, or a combination thereof. The additional information is received via a side channel that is connected to the register interface 340. In some embodiments, the additional information is provided to the controller 315 as part of an installation process for the endpoints 301, 302. For example, location information for the endpoint 301 can be provided to the controller 315 via the register interface 340 prior to or in response to the endpoint 301 being installed. The controller 315 then stores the registered identifier and additional information in the memory 344, e.g., in a database of registered pairs of identifiers and additional information.

Figure 4:
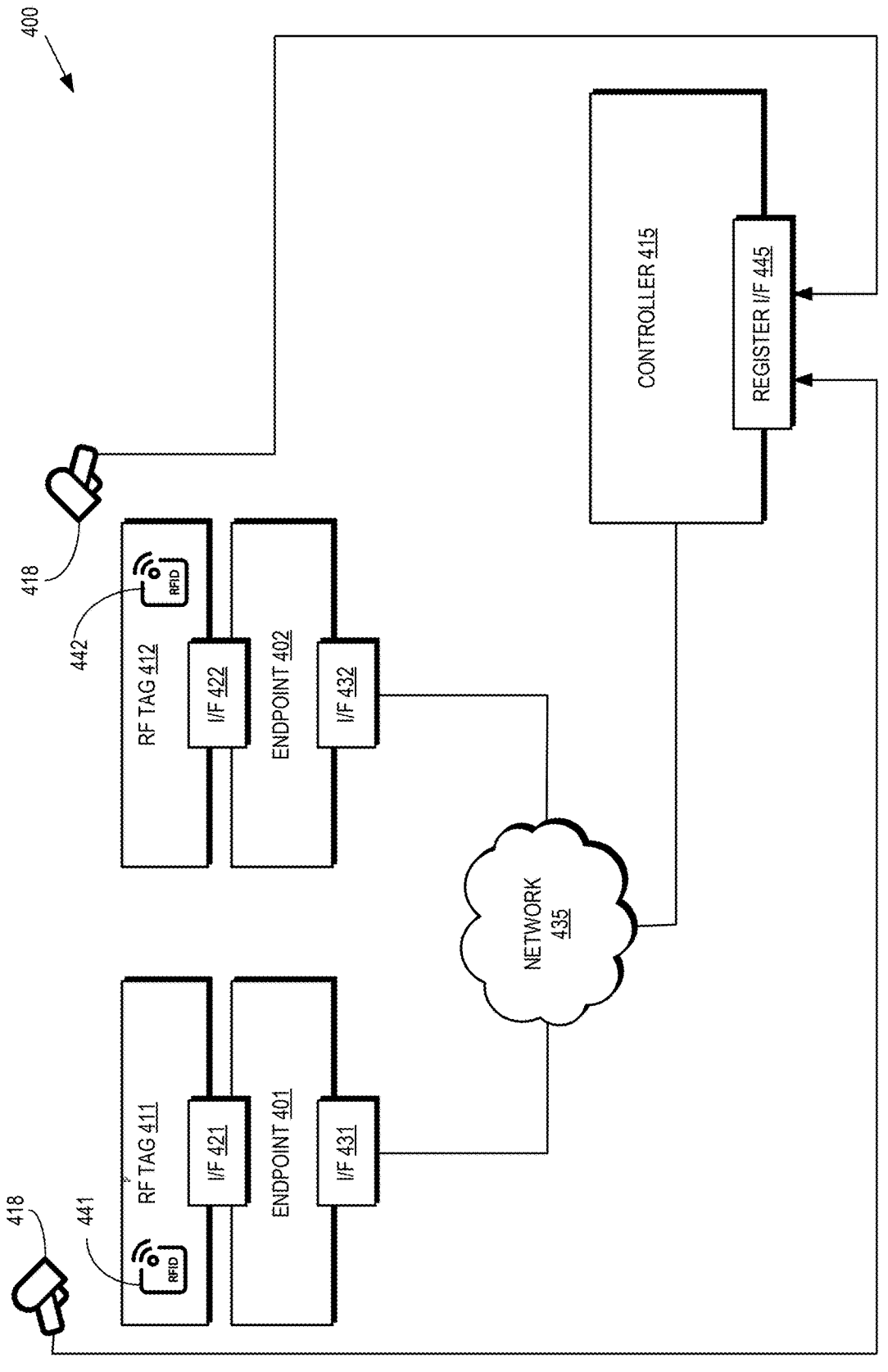
FIG. 4 illustrates a system that includes a scanner that readers identifiers from RF tags and writes locations and identifiers through a side channel to a database and/or a controller, according to some embodiments.

FIG. 4 illustrates a system 400 that includes a scanner 418 that readers identifiers from RF tags 411, 412 and writes locations and identifiers through a side channel to a database and/or a controller 415, according to some embodiments. The system 400 includes endpoints 401, 402 and can represent a portion of the system 100 shown in FIG. 1, in which case the endpoints 401, 402 represent two or more of the endpoints 101-106, the RF tags 411, 412 represent two or more of the RF tags 131-136, and the controller 415 represents the controller 110 shown in FIG. 1. Some embodiments of the endpoints 401, 402 are implemented using substantially identical circuitry and components, and therefore are substantially identical target circuits. The endpoints 401, 402 and the RF tags 411, 412 can be connected to each other by interfaces 421, 422, although in some embodiments the endpoints 401, 402 are not connected to the RF tags 411, 412. The endpoints 401, 402 are connected to the controller 415 via interfaces 431, 432 and a network 435.

The scanner 418 is configured to read identifiers 441, 442 using signals conveyed over the air by the RF tags 411, 412. The identifiers 441, 442 are radio frequency identifiers (RFIDs) in some embodiments. Although a single scanner 418 is shown in FIG. 4, multiple scanners can be used to scan the identifiers 441, 442 associated with the RF tags 411, 412, as well as other identifiers of other RF tags that are not shown in FIG. 4. If the RF tags 411, 412 encrypt the identifiers 441, 442, or generate signatures or authentication information associated with the identifiers 441, 442, the scanner 418 can decrypt the received information, verify a signature associated with the identifiers 441, 442, authenticate the identifiers 441, 442 based on the authentication information, or perform other actions. As discussed herein, these operations can also be performed at other entities including the endpoints 401, 402, and the controller 415.

The scanner 418 registers the identifiers 441, 442 of the RF tags 411, 412 using signals transmitted via a register interface 445 in the controller 415. The scanner 418 also registers other information associated with the endpoints 401, 402, the RF tags 411, 412, or a combination thereof with the controller 415. For example, the scanner 418 can determine locations of the RF tags 411, 412 and/or the endpoints 401, 402 based on the location of the scanner 418 (at the time it reads the identifier) and strengths of signals received from the RF tags 411, 412. In response to receiving the information from the scanner 418, the controller 415 stores information representing the identifiers 441, 442 and the other information such as the location information. Some embodiments of the controller 415 can associate the identifiers 441, 442 with corresponding identifiers of the endpoints 401, 402 so that the identifiers 441, 442 are used as non-redundant identifiers that identify the corresponding endpoints 401, 402. For example, the identifiers 441, 442 can be MAC addresses that are known by the controller 415.

Some embodiments of the endpoints 401, 402 can read the identifiers 441, 442 from the corresponding RF tags 411, 412. For example, if the endpoint 401 is connected to the RF tag 411, the endpoint 401 can read the identifier 441 from the RF tag 411 via the interface 421. Information representing the identifiers 441, 442 can also be provided to the endpoints 401, 402 by the scanner 418, the controller 415, or a combination thereof. Some embodiments of the endpoints

401, 402 store a shadow copy of the corresponding identifiers 441, 442 in their memories (not shown in FIG. 4 in the interest of clarity).

Figure 5:
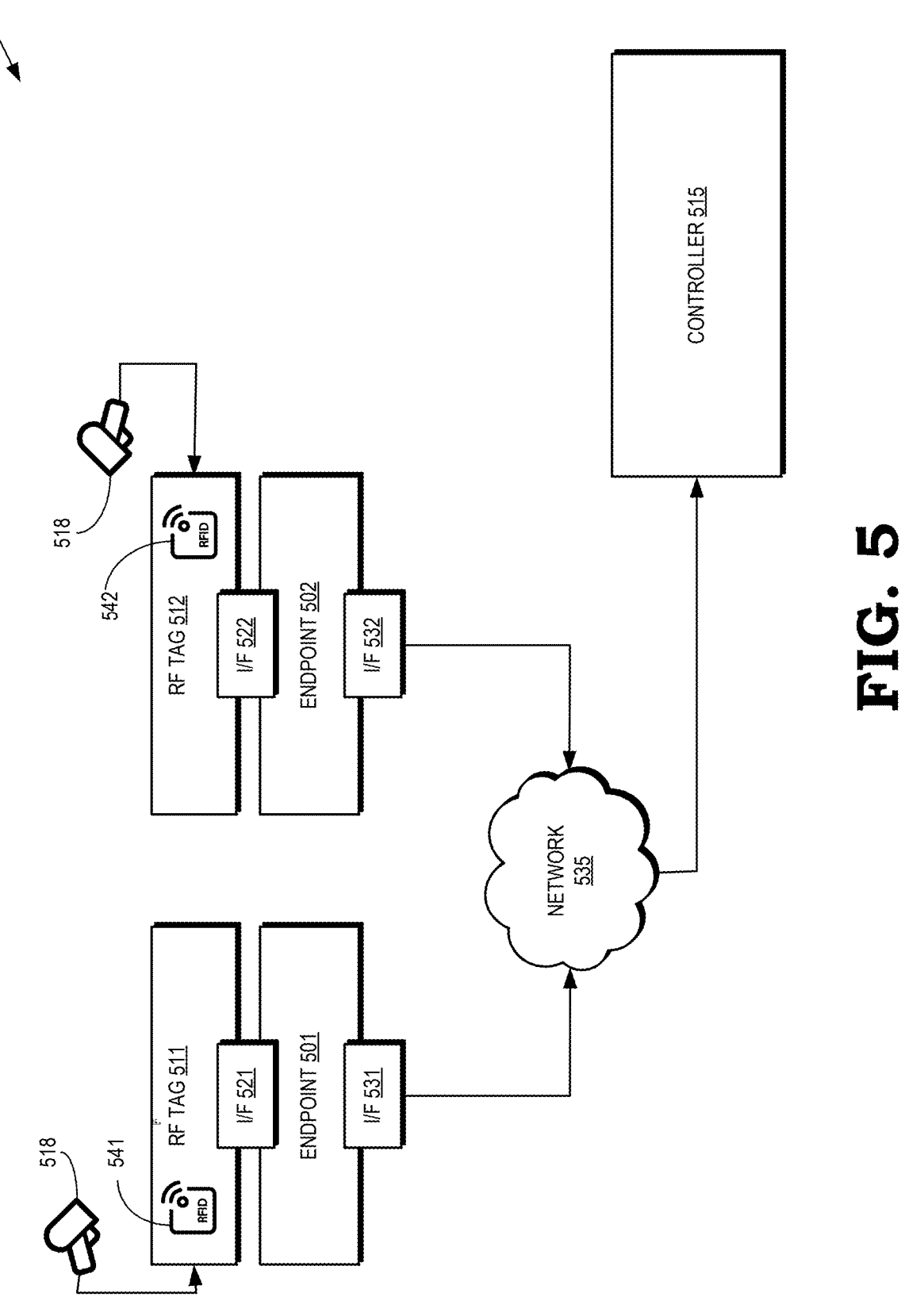
FIG. 5 illustrates a system that includes a scanner that writes locations into RF tags and the locations and identifiers of the RF tags are propagated in-band through a network, according to some embodiments.

FIG. 5 illustrates a system 500 that includes a scanner 518 that writes locations into RF tags 511, 512 and the locations and identifiers of the RF tags 511, 512 are propagated in-band through a network 535, according to some embodiments. The system 500 includes endpoints 501, 502 and can represent a portion of the system 100 shown in FIG. 1, in which case the endpoints 501, 502 represent two or more of the endpoints 101-106, the RF tags 511, 512 represent two or more of the RF tags 131-136, and the controller 515 represents the controller 110 shown in FIG. 1. Some embodiments of the endpoints 501, 502 are implemented using substantially identical circuitry and components, and therefore are substantially identical target circuits. The endpoints 501, 502 and the RF tags 511, 512 are connected to each other by interfaces 521, 522. The endpoints 501, 502 are connected to the controller 515 via interfaces 531, 532 and a network 535.

As discussed herein with regard to FIG. 4, the scanner 518 is configured to read identifiers 541, 542 using signals conveyed over the air by the RF tags 511, 512. The scanner 518 can determine (or read) information associated with the RF tags 511, 512. As discussed herein, information associated with the endpoints 501, 502 can include an endpoint type, a physical location of the endpoint, or a combination thereof. For example, the scanner 518 can determine the locations of the RF tags 511, 512 based on the location of the scanner 518 (at the time it reads the identifier) and strengths of signals received from the RF tags 511, 512.

The system 500 shown in FIG. 5 differs from the system 400 shown in FIG. 4 because the scanner 518 provides the information associated with the endpoints 501, 502 to the corresponding RF tags 511, 512. For example, the scanner 518 can read the identifier 541 from the RF tag 511 and then determine the location of the RF tag 511 based on the location of the scanner 518 and the strength of the signal received when reading the identifier 541. The scanner 518 provides the location information to the RF tag 511, which can store the location information and the corresponding identifier 541 in its local memory.

The endpoints 501, 502 read the identifiers 541, 542 from the corresponding RF tags 511, 512. For example, at initial startup of the endpoint 501, the endpoint 501 reads the identifier 541 from the RF tag 511. As discussed herein, some embodiments of the endpoints 501, 502 can decrypt, verify, validate, or authenticate information received from the RF tags 511, 512 including information representing the identifiers 541, 542. Some embodiments of the endpoints 501, 502 store copies of the identifiers 541, 542 (or other non-redundant identifiers derived from the identifiers 541, 542) and the corresponding information including the location information. The endpoints 501, 502 also transmit the identifier/information pairs to the controller 515, which stores this information in a memory or database.

Figure 6:
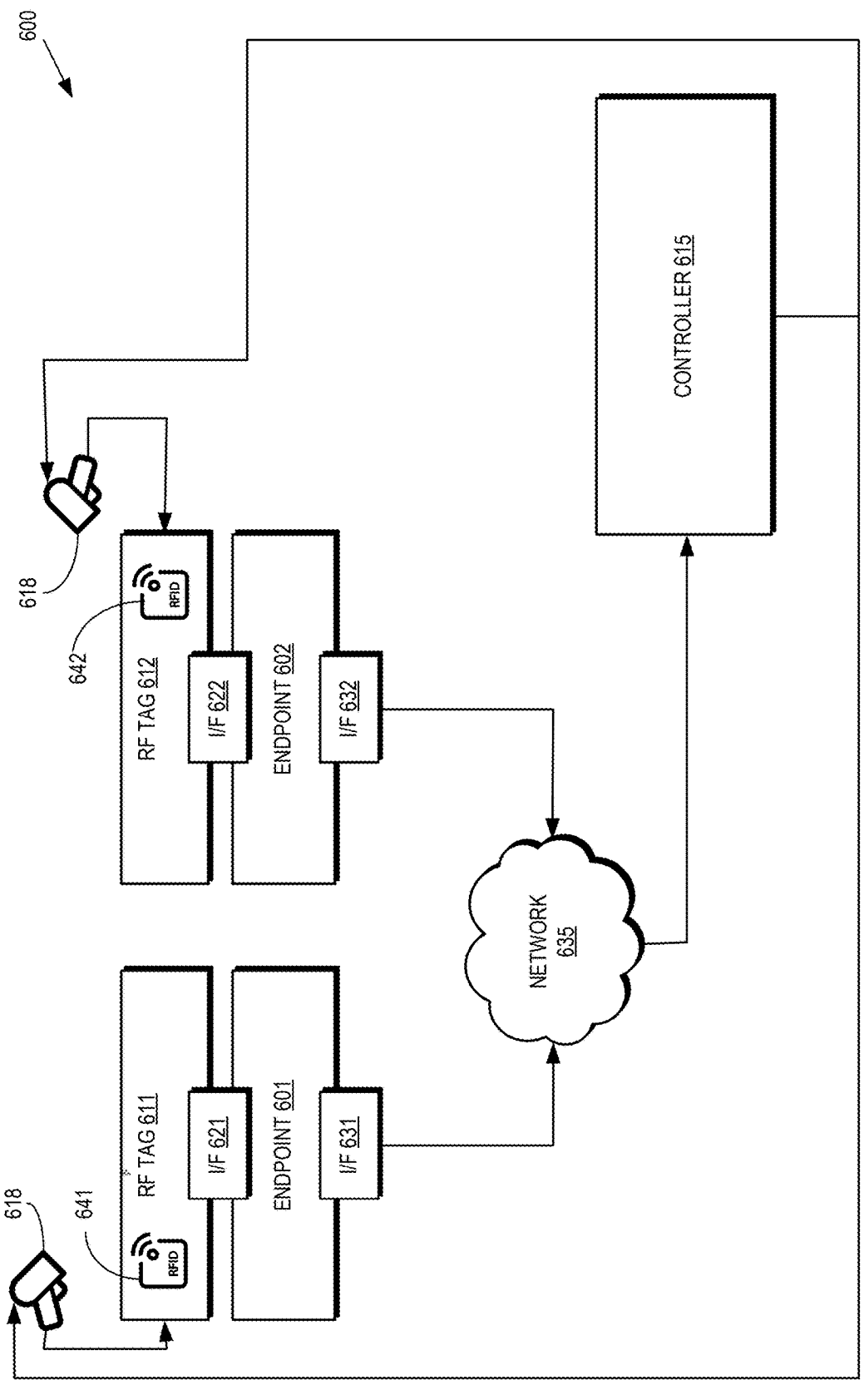
FIG. 6 illustrates a system that includes endpoints and RF tags that are registered using a scanner and information provided by a controller, according to some embodiments.

FIG. 6 illustrates a system 600 that includes endpoints 601, 602 and RF tags 611, 612 that are registered using information provided by a controller 615, according to some embodiments. The system 600 can represent a portion of the system 100 shown in FIG. 1, in which case the endpoints 601, 602 represent two or more of the endpoints 101-106, the RF tags 611, 612 represent two or more of the RF tags 131-136, and the controller 615 represents the controller 110 shown in FIG. 1. Some embodiments of the endpoints 601, 602 are implemented using substantially identical circuitry and components, and therefore are substantially identical target circuits. The endpoints 601, 602 and the RF tags 611, 612 are connected to each other by interfaces 621, 622. The endpoints 601, 602 are connected to the controller 615 via interfaces 631, 632 and a network 635.

In the illustrated embodiment, the controller 615 provides information associated with the endpoints 601, 602 to a scanner 618 (or multiple scanners). The endpoint information can include an endpoint type, a physical location of the endpoint, or a combination thereof. The scanner 618 can read the identifiers 641, 642 from the RF tags 611, 612, and then use the identifiers 641, 642 to select and provide the corresponding endpoint information to the appropriate RF tag 611, 612. For example, if the controller 615 provided endpoint information for both of the endpoints 601, 602 to the scanner 618, the scanner 618 can read the identifier 641 of the RF tag 611, determine that the RF tag 611 is associated with the endpoint 601, and then provide the endpoint information for the endpoint 601 to the RF tag 611, which stores the endpoint information in its local memory.

The endpoints 601, 602 can read the identifiers 641, 642 from the corresponding RF tags 611, 612. As discussed herein, the identifiers 641, 642 are equivalent to or used to derive non-redundant identifiers of the endpoints 601, 602. In some embodiments, the endpoint information is provided to the scanner 618 prior to installation or startup of the endpoints 601, 602. In that case, the endpoints 601, 602 can read the endpoint information and corresponding identifiers 641, 642 from the corresponding RF tags 611, 612 in response to installing or starting up the endpoints 601, 602. The endpoints 601, 602 also register the corresponding identifiers 641, 642 and associated endpoint information with the controller 615, which stores the information in a local memory or database.

Figure 7:
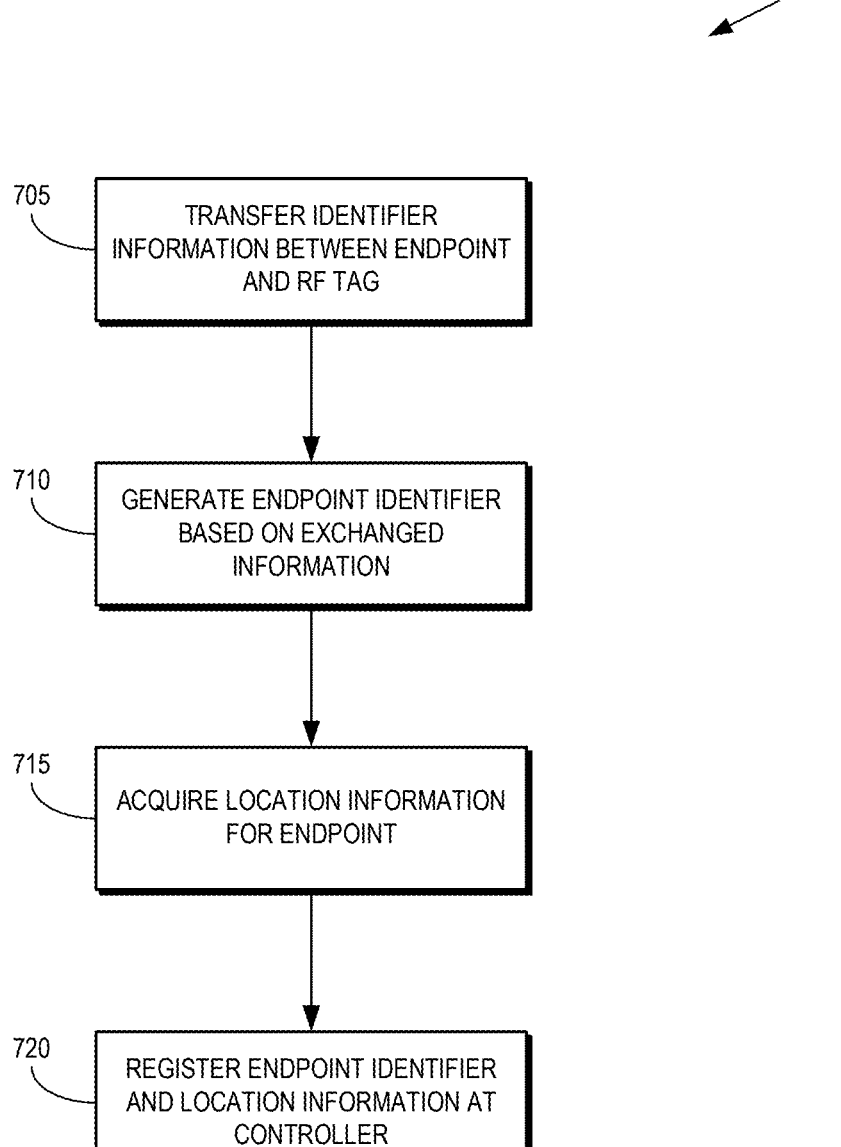
FIG. 7 illustrates a method of registering endpoints or target circuits with a controller, according to some embodiments.

FIG. 7 illustrates a method 700 of registering endpoints or target circuits with a controller, according to some embodiments. The method 700 is implemented in some embodiments of the system 100 shown in FIG. 1, the system 200 shown in FIG. 2, the system 300 shown in FIG. 3, the system 400 shown in FIG. 4, the system 500 shown in FIG. 5, and the system 600 shown in FIG. 6.

At block 705, identifier information is transferred between an endpoint and an RF tag in the system. As discussed herein, the identifier information can be transferred over a wired or wireless interface between the endpoint and the RF tag, or the identifier information can be conveyed between the endpoint and the RF tag via other entities including a scanner, a controller, a network, or combinations thereof.

At block 710, an endpoint identifier, which may be referred to as a non-redundant endpoint identifier, is generated based upon the transferred information. For example, if an identifier of an RF tag is conveyed to the endpoint, the endpoint identifier can be equated to the identifier of the RF tag or derived from the identifier of the RF tag using a predetermined algorithm.

At block 715, location information for the endpoint is acquired. The location information can be acquired using a scanner, provided by a controller, entered manually, or a combination thereof. Other information associated with the endpoint can also be acquired.

At block 720, the endpoint identifier and the location information (and other information, if available) are registered with the controller. For example, the controller can store the endpoint identifier and the location information in a local memory or database. The information received and stored at the controller can also include other information associated with the endpoint such as an endpoint type.

Embodiments of the systems and methods described herein may have numerous advantages over conventional endpoint registration techniques. Endpoints that operate in accordance with the systems and methods disclosed herein may not be pre-programmed with an identifier such as a UID because the endpoints can derive their unique identifier from an attached RF tag. The derived unique identifier can then be used to support endpoint logistics including device management, procurement, shipping, installation, maintenance, and lifecycle tracking. The unique identifiers of the endpoints can be read out wirelessly after installation for sanity checks, quality assurance, network registration, and the like. Maintenance and/or replacement of the endpoints can be tracked by reading the RF tag, e.g., with a handheld scanner. Installed or replaced endpoints can be registered or reregistered with the network using embodiments of the registration processes discussed herein. Network endpoint authentication can be based on the unique identifier, which can be encrypted, signed, or attached to authentication information for enhanced security, and network integrity protection can be derived from authenticated endpoints. Full physical and logical location discovery of endpoints can also be performed using embodiments of the systems and methods discussed herein.

In some embodiments, certain aspects of the techniques described above are implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

A computer readable storage medium can include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
conveying first information identifying a first one of a target circuit or a radio frequency (RF) tag to a second one of the target circuit or the RF tag;
performing at least one of encrypting the first information, signing the first information, or generating authentication information for the first information prior to conveying the first information;
determining second information identifying the second one of the target circuit or the RF tag from the conveyed first information;
performing at least one of decrypting the encrypted first information, verifying a signature on the first information, or authenticating the first information prior to deriving the second information; and
storing the second information.

2. The method of claim 1, wherein conveying the first information comprises conveying the first information over at least one of a wired interface or a wireless interface between the target circuit and the RF tag.

3. The method of claim 1, wherein conveying the first information comprises conveying first information identifying the RF tag to the target circuit, and wherein deriving the second information comprises deriving second information identifying the target circuit based on the first information identifying the RF tag.

4. The method of claim 3, wherein deriving the second information comprises one of equating the second information to the first information; or applying a predetermined algorithm to the first information to generate the second information.

5. The method of claim 1, further comprising:
determining a location of the target circuit; and
registering the location and the second information with a controller that is configured to provide control signaling to the target circuit.

6. The method of claim 5, wherein determining the location of the target circuit comprises detecting the RF tag using a scanner and determining the location of the target circuit based on at least one of a location of the scanner and a strength of a signal received by the scanner from the RF tag.

7. The method of claim 6, further comprising:

scanning, using the scanner, an area proximate an expected installation location of the target circuit and the RF tag; and locating or confirming the location of the target circuit in response to detecting the RF tag proximate the expected installation location.

8. An apparatus comprising:

a radio frequency (RF) tag; and a target circuit coupled to the RF tag by an interface that is configured to convey first information identifying a first one of the target circuit or the RF tag to a second one of the target circuit or the RF tag, and wherein the second one of the target circuit or the RF tag is configured to derive second information identifying the second one of the target circuit and the RF tag from the conveyed first information, wherein the RF tag is configured to perform at least one of encrypting the first information, signing the first information, or generating authentication information for the first information prior to conveying the first information to the target circuit via the interface, and wherein the target circuit is configured to perform at least one of decrypting the encrypted first information, verifying a signature on the first information, or authenticating the first information prior to deriving the second information.

9. The apparatus of claim 8, wherein the interface comprises at least one of a wired interface between the target circuit and the RF tag and a wireless interface between the target circuit and the RF tag.

10. The apparatus of claim 8, wherein the interface is configured to convey first information identifying the RF tag to the target circuit, and wherein the target circuit is configured to derive the second information identifying the target circuit based on the first information identifying the RF tag.

11. The apparatus of claim 10, wherein the target circuit is configured to equate the second information to the first information or apply a predetermined algorithm to the first information to generate the second information.

12. A system comprising:

at least one target circuit coupled to at least one radio frequency (RF) tag by at least one interface, wherein:

the at least one interface is configured to convey first information identifying the at least one RF tag to the at least one target circuit, the at least one target circuit is configured to derive second information identifying the at least one target circuit and from the conveyed first information identifying the at least one RF tag, the at least one RF tag is configured to perform at least one of encrypting the first information, signing the first information, or generating authentication information for the first information prior to conveying the first information to the at least one target circuit via the at least one interface, and the at least one target circuit is configured to perform at least one of decrypting the encrypted first information, verifying a signature on the first information, or authenticating the first information prior to deriving the second information; and a controller configured to provide control signals to the at least one target circuit based on at least one location of the at least one target circuit.

13. The system of claim 12, wherein the at least one interface comprises at least one of a wired interface between the at least one target circuit and the at least one RF tag and a wireless interface between the at least one target circuit and the at least one RF tag.

14. The system of claim 12, wherein the at least one target circuit is configured to equate the second information to the first information or apply a predetermined algorithm to the first information to generate the second information.

15. The system of claim 12, wherein the controller is configured to receive information indicating the at least one location of the at least one target circuit and register the at least one location and the second information derived by the at least one target circuit.

16. The system of claim 15, further comprising:

a scanner configured to detect the at least one RF tag and determine the at least one location of the at least one target circuit based on at least one of a location of the scanner and a strength of a signal received by the scanner from the at least one RF tag, wherein the scanner is configured to scan an area proximate an expected installation location of the at least one target circuit and the at least one RF tag, and wherein the controller is configured to locate or confirm the at least one location of the at least one target circuit in response to detecting the at least one RF tag proximate the expected installation location.

* * * * *